United States Patent [19]

Suzuki et al.

[11] Patent Number: 6,108,731
[45] Date of Patent: Aug. 22, 2000

[54] INFORMATION PROCESSOR AND METHOD OF ITS COMPONENT ARRANGEMENT

[75] Inventors: Shinichi Suzuki; Tsunehiro Tobita, both of Yokohama; Yoshitsugu Ichieda; Hiroyuki Hodo, both of Nagoya; Mihoko Kudou, Toki; Tetsuo Hiramitsu, Owariasahi; Hideki Osaka, Hiratsuka; Tsutomu Hara, Fujisawa, all of Japan

[73] Assignee: Hitachi, Ltd., Tokyo, Japan

[21] Appl. No.: 09/117,741

[22] PCT Filed: Feb. 9, 1996

[86] PCT No.: PCT/JP96/00285

§ 371 Date: Aug. 4, 1998

§ 102(e) Date: Aug. 4, 1998

[87] PCT Pub. No.: WO97/29415

PCT Pub. Date: Aug. 14, 1997

[51] Int. Cl.[7] ..................................................... G06F 13/00
[52] U.S. Cl. ........................... 710/102; 710/101; 710/104; 710/126; 710/128; 710/129; 710/2; 710/8; 364/240
[58] Field of Search ..................................... 710/100, 101, 710/102, 104, 126, 129, 128, 260, 10, 22, 131, 2, 8; 364/240, 240.2

[56] References Cited

U.S. PATENT DOCUMENTS 5,175,515 12/1992 Abernathy et al. ..................... 333/4
5,442,520 8/1995 Kemp et al. ......................... 361/785

FOREIGN PATENT DOCUMENTS

| 6-45712 | 2/1994 | Japan . |
| 6-151694 | 5/1994 | Japan . |
| 7-36570 | 2/1995 | Japan . |
| 6-151694 | 3/1996 | Japan . |
| 8-64982 | 3/1996 | Japan . |

*Primary Examiner*—Ario Etienne
*Attorney, Agent, or Firm*—Mattingly, Stanger & Malur, P.C.

[57] ABSTRACT

A plurality of processor elements (31 to 34) are disposed on a main board (710) in line in parallel with a first edge of the main substrate (710). Expansion board slots (331 to 336) into which an expansion board for mounting an I/O interface thereon is plugged and a memory connector (341) to which a memory board for mounting a memory thereon is connected are disposed in a region of the main substrate opposite to the first edge. The long sides of the expansion board slots (331 to 336) and the memory board connector (341) are in parallel with the first edge. A bridge LSI for executing protocol conversion between processor buses (210, 211, 212) and an I/O bus (230) and memory controllers (151, 152) for controlling memory access are disposed in regions adjacent to both the expansion board slots and the processor elements. The processor bus (210, 211, 212) is bent into a protuberance shape so that a branch does not substantially form and the bridge LSI and memory controller are substantially at the middle portion of a plurality of processors. The processor bus connects the processor elements, the bridge LSI and the memory controller in this order.

10 Claims, 12 Drawing Sheets

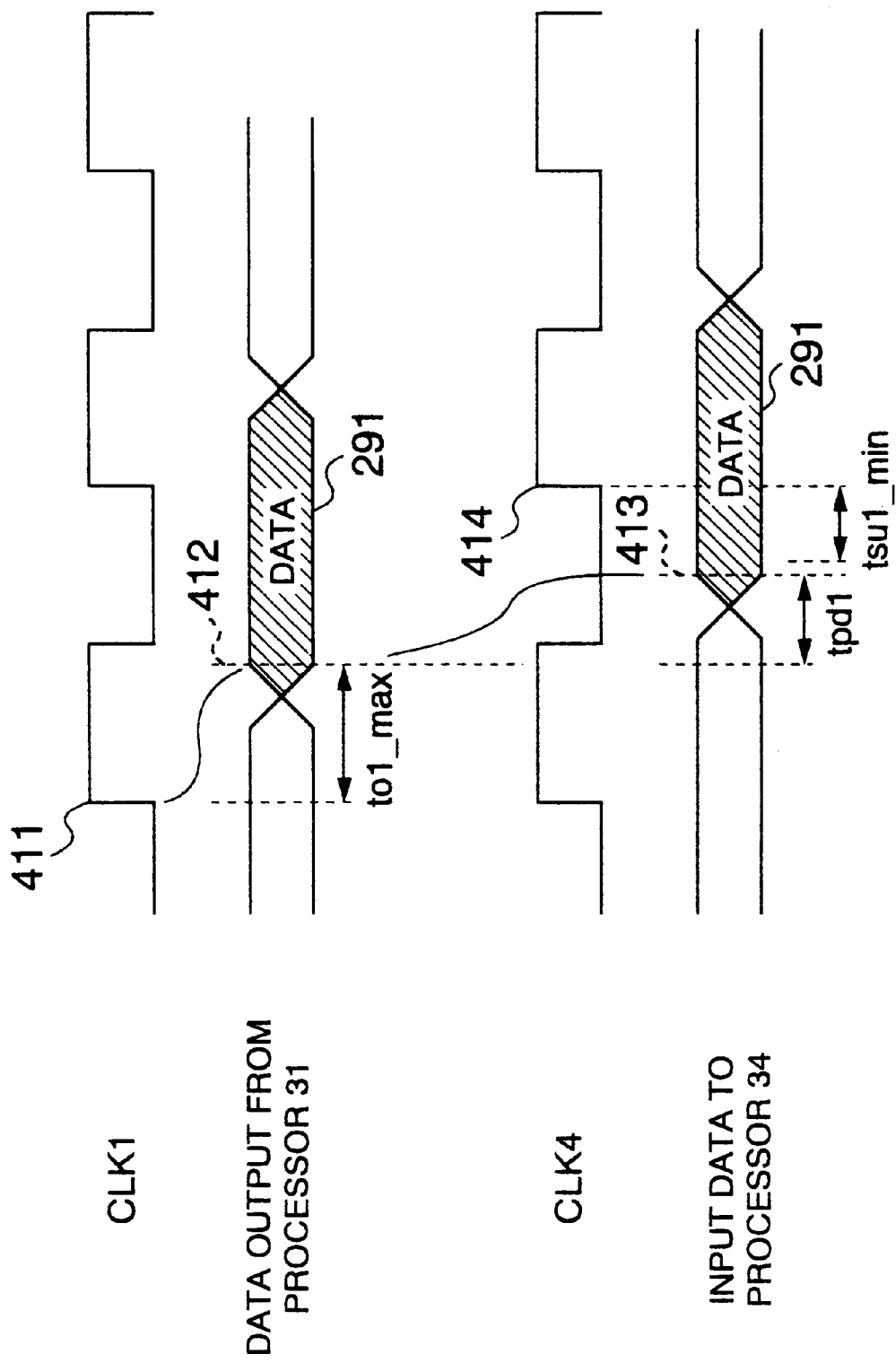

FIG. 6

| TRANSMISSION SIDE / RECEPTION SIDE | CPU 31 | CPU 32 | PCI BRIDGE 160 | MEMORY CONTROLLER 151 | MEMORY CONTROLLER 152 | CPU 33 | CPU 34 |
|---|---|---|---|---|---|---|---|
| CPU 31 | | | | $Lip2\_max \geq Lb1+Lb2+Lb31$ | $Lip2\_max \geq Lb1+Lb2+Lb32$ | | $Lpp\_max \geq Lb1+Lb2+Lb31+Lb41+Lb5$ AND $Lpp\_max \geq Lb1+Lb2+Lb32+Lb42+Lb5$ |
| CPU 32 | | | | | | | |
| PCI BRIDGE 160 | | | | $Lbm\_max \geq Lb31$ | $Lbm\_max \geq Lb32$ | | $Lip\_max \geq Lb5+Lb41+Lb3$ AND $Lip\_max \geq Lb5+Lb42+Lb3$ |
| MEMORY CONTROLLER 151 | $Lip1\_max \geq Lb1+Lb2+Lb31$ | | $Lbm\_max \geq Lb31$ | | | | |
| MEMORY CONTROLLER 152 | $Lip1\_max \geq Lb1+Lb2+Lb32$ | | $Lbm\_max \geq Lb32$ | | | | |
| CPU 33 | | | | | | | |
| CPU 34 | $Lpp\_max \geq Lb1+Lb2+Lb31+Lb41+Lb5$ AND $Lpp\_max \geq Lb1+Lb2+Lb32+Lb42+Lb5$ | | $Lip2\_max \geq Lb5+Lb41+Lb31$ AND $Lip2\_max \geq Lb5+Lb42+Lb32$ | | | | |

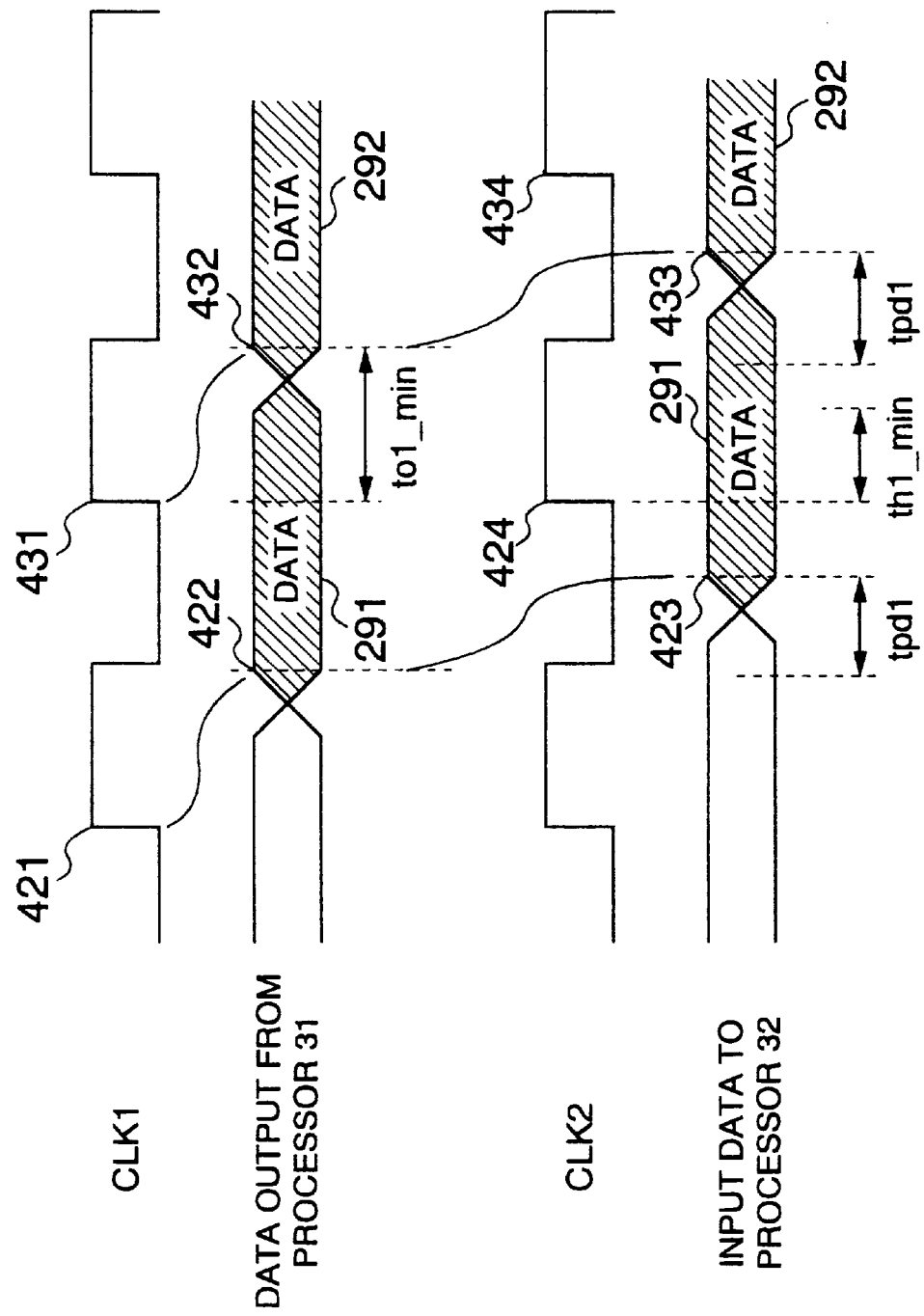

FIG. 8

| TRANSMISSION SIDE / RECEPTION SIDE | CPU 31 | CPU 12 | PCI BRIDGE 160 | MEMORY CONTROLLER 151 | MEMORY CONTROLLER 152 | CPU 33 | CPU 34 |
|---|---|---|---|---|---|---|---|
| CPU 31 | | $Lpp\_min \leq Lb1$ | | | | | |
| CPU 32 | $Lpp\_min \leq Lb1$ | | $Lip2\_min \leq Lb2$ | | | | |
| PCI BRIDGE 160 | | $Lip1\_min \leq Lb2$ | | $Lbm\_min \leq Lb31$ | $Lbm\_min \leq Lb32$ | | |
| MEMORY CONTROLLER 151 | | | $Lbm\_min \leq Lb31$ | | | $Lip1\_min \leq Lb41$ | |
| MEMORY CONTROLLER 152 | | | $Lbm\_min \leq Lb32$ | | | $Lip1\_min \leq Lb42$ | |
| CPU 33 | | | | $Lip2\_min \leq Lb41$ | $Lip2\_min \leq Lb42$ | | |
| CPU 34 | | | | | | $Lpp\_min \leq Lb5$ | $Lpp\_min \leq Lb5$ |

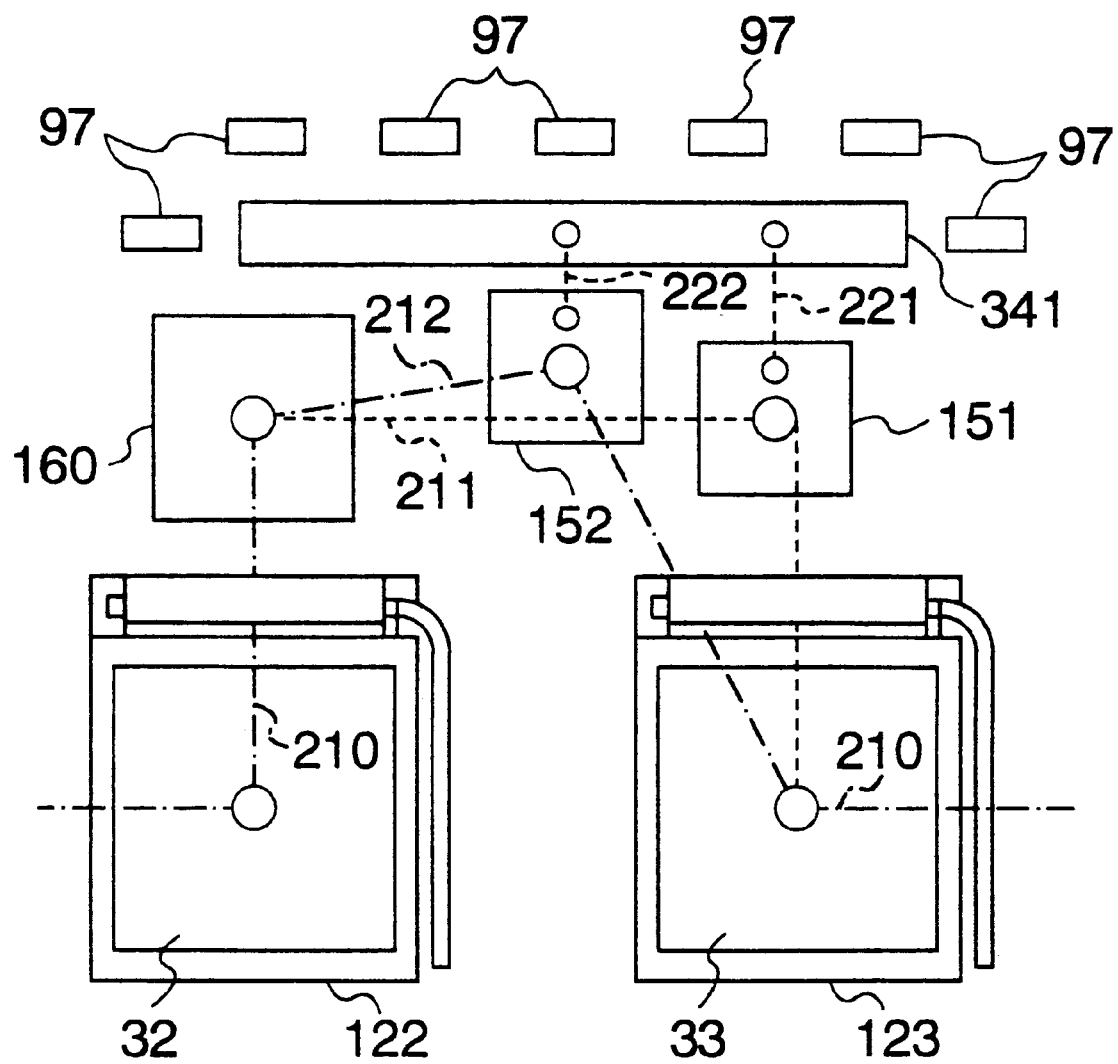

INFORMATION PROCESSOR AND METHOD OF ITS COMPONENT ARRANGEMENT

TECHNICAL FIELD

The present invention relates in general to information processors, such as a personal computer and a workstation, each of which is capable of mounting thereon a plurality of processors, and more particularly to a printed circuit board layout of buses and components which is suitable for these information processors.

BACKGROUND ART

In recent years, a client server system employing a personal computer (PC) has come into wide use due to down-sizing. In the client server system, a server executes the database retrieval for example in response to requests from a plurality of clients, and hence a high data processing capability is required therefor. For this reason, there has developed a construction which employs an operating system (OS) for a multiprocessor and in which a plurality of processors are mounted on a PC used as a server (hereinafter, the PC of this sort is particularly referred to as "a PC server" for short, when applicable) to construct an operating system and the processings are distributed among these processors.

As for a system for mounting a plurality of processors on one PC, there is known a system employing a processor board. Conventionally, this system is a system which has been used in a relatively large scale workstation or personal computer. This system is such that a board (a processor board) on which one or two processors and a cache system are mounted is connected through a connector to a system bus which is distributed on a main board and which is called a shared bus in order to be used. On the main board, there are disposed a memory interface, a memory module, an I/O bus bridge, an I/O interface board and the like. The details of this system are described in an article of "MULTIPROCESSOR SYSTEM ARCHITECTURE", p. 269, published by PRENTICE HALL Corporation.

In the system employing the processor board as described above, an interface LSI for a connector and a shared bus is required every processor board. In addition, in order to enhance the performance of the system, the cache system and the clock generator which is locally arranged are mounted on the processor board. As a result, the number of components of the overall system is increased. In addition, since the high speed shared bus signals are connected through the connector, the price of the system becomes relatively high due to the factors such as the use of the connector through which the signal is transmitted with less distortion and which is excellent in electrical characteristics and the complicated chassis structure resulting from the fixing of a plurality of boards.

For this reason, in recent years, as the integration of the LSIs has been increased, the processor which self-contains the bus interface and the cache for use in constructing the multiprocessor is also on the market. Then, a plurality of processors, the memories-and the I/O interface are disposed on one main board by employing such a processor.

Now, the interchangeability of the I/O interfaces is very important in the PC server. The I/O interfaces for the PC are on the market in the form of the expansion boards, and hence a user may select and purchase desired ones on the basis of the performance and the introduction cost which are required for the server system. In addition, it is also widely carried out that a user himself/herself attaches and detach the expansion cards thereto and therefrom. In such a way, if the I/O interfaces are made common and also the operating hardware is not limited, this assists the free price competition among the I/O expansion board makers, and also a user can always construct the system which is excellent in price-to-performance ratio by employing the newest and high performance products.

Currently, in the PC server, the I/O bus specification called a PCI is widely used. The PCI bus is the local bus for which the standardization is in progress under the leadership of INTEL CO. LTD., U.S.A., by the standardization group i.e., the PCI Special Interest Group, and the expansion boards each conforming to this specification have the common size, connection connector shape and bus protocol. The details thereof are described in an article of "PCI LOCAL BUS SPECIFICATION REV. 2. 1, Jun. 1, 1995" published by the above-mentioned Group. As for the PCI expansion cards, the card having the board size called LONG CARD, the card having the board size called SHORT CARD, and the card having the intermediate board size are on the market. Since a large number of expansion boards, such as the high speed network I/F and the desk array I/F, each of which is excellent in I/O processing performance are of a LONG CARD type, preferably, the PC server can use the expansion card of LONG CARD if possible. This PCI bus is the unterminated bus which is operated at a frequency of 33.3 . . . MHz at maximum, and hence in order to use the bus and the I/O interface at the highest frequency, it is necessary to take the length of the transmission line of the PCI bus and the electrical characteristics thereof into consideration.

In order that a plurality of processors may be disposed on the same main board and also the PC server may be designed which is excellent in price-to-performance ratio, the various problems need to be solved. In recent years, a large number of processors each of which is operated at the frequency equal to or higher than 100 MHz are on the market. In particular, in the case of the high end processor which is used in the PC server, the power consumption thereof is large on the order of about 10 to 30 W. For this reason, in order to cool the processor, it is essential to the processor of this sort to attach the heat sink thereto. While the heat radiation characteristics of the heat sink are varied depending on the temperature within the chassis and the speed of air flowing through the fins of the heat sink, in general, in order to cool the heat radiation of about 30 W, it is necessary to employ the heat sink which has the component height equal to or larger than 30 mm. This component height is larger than the minimum distance (a clearance) between the base of the board in which the card edge is disposed and the main board in the PCI expansion card. Therefore, there arises the problem that the PCI expansion card may come in contact with the heat sink depending on the positions of the processors so that the printed circuit on the PCI expansion card will be short-circuited and the PCI expansion card of LONG CARD will not be able to be plugged into the PCI expansion slots.

On the other hand, the price-to-performance ratio is important in the PC server, and hence it becomes important that the area of the main board is reduced as much as possible to reduce the manufacturing cost of the board and the chassis. For this reason, how the PCI expansion card, the connector and the processors are disposed without interference becomes the important design standard. In addition, ensuring the flow of air flowing through the heat sink and how the calorification from the processors is effectively cooled are the problems in the chassis design.

In general, since a plurality of processors and LSIs are connected to the processor bus, the terminated bus is employed which is capable of realizing the relatively long bus length for the same clock as a result of suppressing the reflections at the end portions of the transmission line. On the other hand, each of the memory bus and the PCI bus is the unterminated bus, and hence in order to suppress the distortion of the signal waveform, it is desirable to distribute the transmission line length as short as possible. In addition, the PCI bus expansion cards such as the hard disk interface and the network interface which are connected to the PC server are now manufactured by various board makers. Then, though these cards are defined by the specification, the electrical characteristics thereof vary widely. In order that the PCI bus routed on the main board may be operated at 33.3 . . . Mhz as the maximum operating frequency of the PCI bus irrespective of the arbitrary combination of these cards, it is desirable to increase the margin to the timing requirements of the PCI bus as much as possible. Therefore, the trade off of the line length of the processor bus, the memory bus and the PCI bus is a serious problem.

In addition, since the high performance processor is operated at a frequency of a high speed clock, e,g., at 100 MHz, it is manufactured by utilizing the newest semiconductor process. Also, as for the package for accommodating the chip associated therewith, there is employed ones such as the Pin Grid Array (PGA) each of which is excellent in electrical characteristics. On the other hand, with respect to the LSIs such as the memory controller and the PCI bridge, it is desirable to reduce the price thereof by utilizing the general process. However, if the inexpensive process and package are employed, then the gate delay time elapsed till the electrical signal is outputted from the clock of the LSI, and the set up time become larger values than those of the associated processor, and hence the margin to the timing requirements becomes smaller all the more.

DISCLOSURE OF INVENTION

In the light of the foregoing, it is therefore a first object of the present invention to provide a method of disposing buses and components by which expansion cards of LONG CARD can be respectively plugged into PCT connectors and also the area of a main board can be reduced as much as possible.

In addition, it is a second object of the present invention to provide component arrangement and timing design procedure by which the operating frequency of a processor bus can be made a maximum operating frequency defined by the associated processor, and also the margin to the timing requirements of a memory bus can be increased as much as possible.

In addition, it is a third object of the present invention to provide a method of disposing components and a chassis structure by which processors each having a large amount of calorification can be collectively air-cooled.

Further, it is a fourth object of the present invention to increase the margin to the timing requirements between processors and memory controllers, and between processors and a PCI bus bridge.

According to the present invention, in order to attain the above-mentioned objects, a plurality of processors are disposed on a system board in one line and in parallel with a first edge of the system board. Expansion board slots into which expansion cards each for mounting thereon an I/O interface are plugged and a memory board connector to which a memory board for mounting thereon a memory is connected are disposed in a region of the system board opposite to the first edge of the system board with respect to the region in which the processors are disposed. In addition, the directions of the expansion board slots and the memory board connector are made to match each other in such a way that the long sides thereof are in parallel with the first edge of the system board. A bridge LSI for executing protocol conversion between processor buses through which the processors are connected and an I/O bus through which the I/O interface is connected, and memory controllers for controlling an access to the memory mounted on the memory board are disposed along the extension direction of the long sides of the expansion board slots and are disposed in regions adjacent to a region in which the expansion board slots are disposed. In a more preferred embodiment, the bridge LSI is disposed so as to be in close proximity to the expansion board slots connected thereto, and also the memory controllers are disposed so as to be in close proximity to the memory board connector. The processor buses connect the processors, the bridge LSI and the memory controllers in turn in such a way that a substantial branch does not form, and both of the bridge LSI and the memory controllers are approximately in the middle of the plurality of processors.

In addition, the information processor of the present invention is constructed in such a way that the above-mentioned system board is mounted in a chassis. In a preferred embodiment, a fan which is installed in order to blow air into the chassis is provided on the chassis surface which is formed on the extension line of the line of the processors mounted on the system board. In addition, the chassis surface opposite to the chassis surface having the fan installed therein is provided with an aperture through which air blown by the fan is exhausted to the outside.

BRIEF DESCRIPTION OF DRAWINGS

FIG. 5 is a timing diagram useful in explaining the limit in the maximum length of a transmission line distributed between processors;

FIG. 6 is a table useful in explaining the conditions for the maximum length of a transmission line distributed between the elements;

FIG. 7 is a timing diagram useful in explaining the minimum length of the transmission line distributed between the elements;

FIG. 8 is a table useful in explaining the conditions for the minimum length of the transmission line distributed between the elements;

FIG. 9 is a partially enlarged view showing layout of decoupling capacitors disposed in the vicinity of a slot for a memory board;

BEST MODE FOR CARRYING OUT THE INVENTION

The present invention will hereinafter be described by taking a PC server as an information processor as an example with reference to the accompanying drawings.

Figure 1:
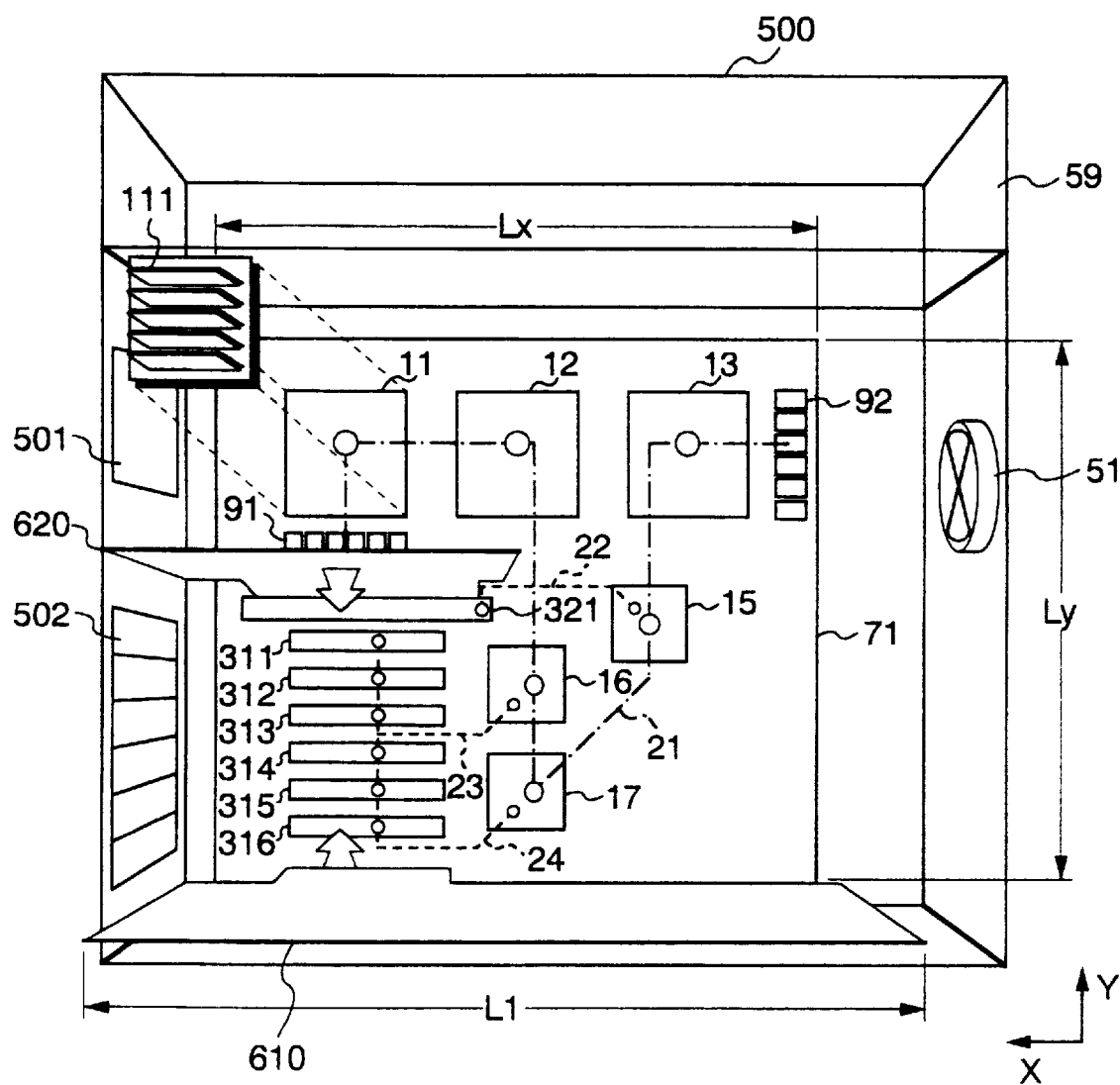
FIG. 1 is an internal side elevational view showing the layout of components of an information processor according to the present invention.
Figure 2:
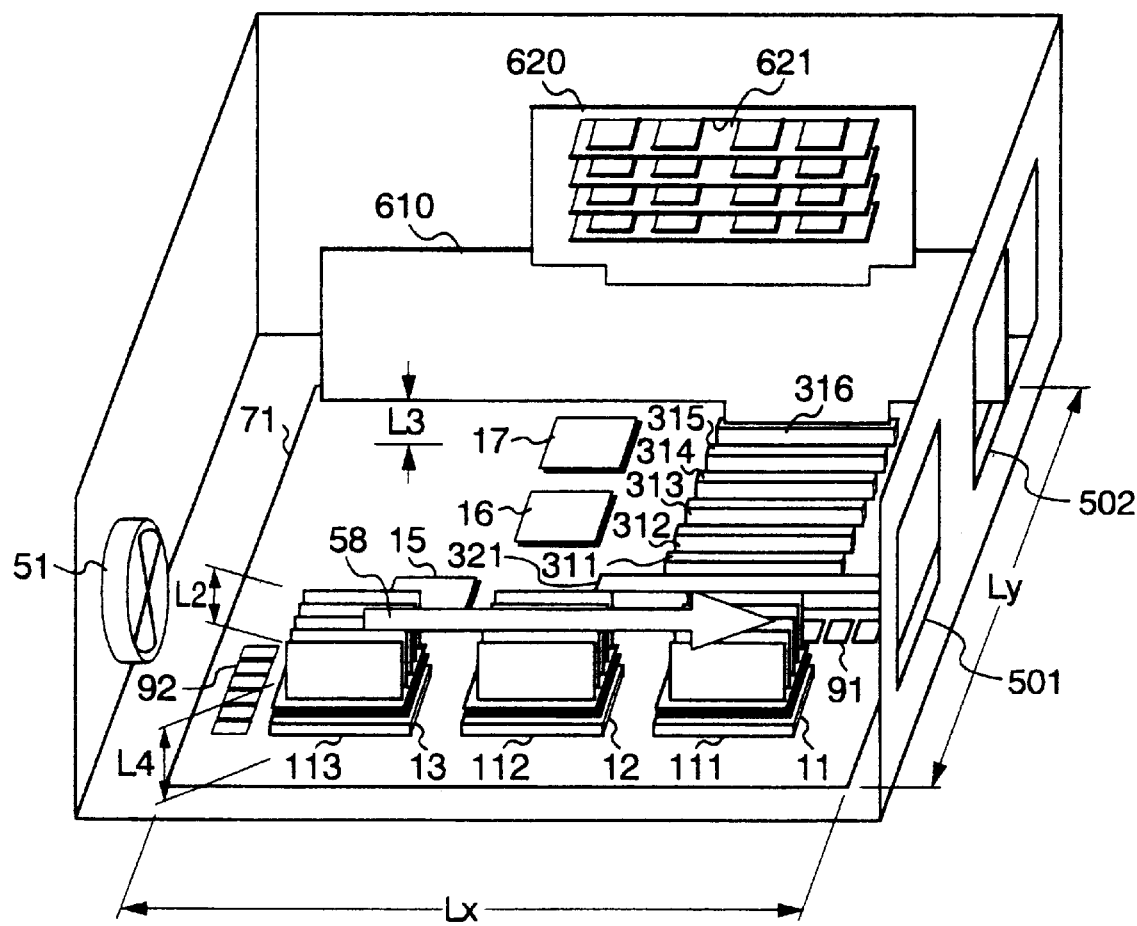
FIG. 2 is a bird's eye view useful in explaining the spatial interference between components in the components layout shown in FIG. 1.

FIG. 1 is an internal side elevational view showing layout of components of a PC server according to one embodiment of the present invention, and FIG. 2 is a bird's eye view showing, likewise, the component layout in the inside of the PC server. The PC server of the present embodiment is constructed in such a way that a system board 71 on which main circuit components are mounted is mounted in a chassis 500. The system board 71 in the present embodiment has the general board size called a Full-AT size, and the length thereof in the X direction (the transverse direction in the figure) is Lx=about 300 mm and the length thereof in the Y direction (the lengthwise direction in the figure) is Ly=about 330 mm. In addition, a space 59 is defined above the chassis 500 and a hard disk, a power source and the like are mounted in this space 59. In the board of the Full-AT size, with respect to the positions of tapped holes for attaching therethrough the system board 71 to the chassis 500, and the relative position of a chassis I/O aperture 502 to PCI expansion board slots 311 to 316, the common specification is present which is widely used in the industry, and also a large number of makers of manufacturing the chassis corresponding to this board size are also present. The system board 71 in the present embodiment was manufactured in conformity to this specification. The chassis I/O aperture 502 is used in order to fix a PCI expansion card 610 and also to expose a connector on the PCI expansion card 610 to the outside. The PC server of the present embodiment is provided with six PCI connectors 311 to 316 and hence is capable of accommodating six sheets of PCI expansion boards.

Processors 11, 12 and 13 are mounted either directly or through a socket on the system board 71. Each of the processors 11 to 13 self-contains a terminated bus interface such as a GTL and is connected to a terminated processor bus which is distributed on the system board along the path indicated by a dashed line 21 in the figure. In this connection, for the sake of convenience, the dashed line 21 will hereinbelow be described as the processor bus. In the terminated bus, the signal reflections at the bus ends are small, and hence for the fixed bus operating frequency, it is possible to realize the bus length which is longer than that of the unterminated bus. As for the processor having the terminated bus interface, for example, there is known the PentiumPro processor manufactured by INTEL CO. LTD. To the processor bus 21, there are further connected a termination circuits 91 and 92, bridges 16 and 17, and a memory controller 15.

In FIG. 2, reference numeral 111 designates a heat sink mounted to the processor 11, reference numeral 112 designates a heat sink mounted to the processor 12 and reference numeral 113 designates a heat sink mounted to the processor 13. In order to sufficiently cool the calorification from the individual processors, as for each of the heat sinks 111 to 113, there is employed one which has the component height equal to or higher than 30 mm.

The memory controller 15 and a memory board connector 321 are connected to each other through the memory bus which is routed along a broken line 22. A memory board 620 on which memory modules 621 are mounted is inserted into the memory slot 321. Each of the bridges 16 and 17 is the LSI which has the functions of converting the protocol and the signal level of the processor bus 21 into the protocol and the signal level of the PCI buses routed along broken lines 23 and 24, respectively. Each of the bridges 16 and 17, and the memory controller 15 has the shape of the flat package type LSI. Incidentally, similarly to the processor bus 21, the broken line 22, and the broken lines 23 and 24 will hereinbelow be described as the memory bus, and the PCI buses, respectively.

The PCI buses 23 and 24 which connect the bridges 16 and 17, and the PCI expansion board slots are the buses employing the reflections at the bus ends, and are changed in delay time due to the characteristic impedances of the bus lines. In the operation at a frequency of 33.3 ... MHz which is normally used, only up to the four PCI connectors can not be used for one bridge. In the present embodiment, since there is a limit in the lengthwise size of the system board 71, the number of PCI expansion board slots is set to six, and also the six PCI expansion board slots are divided into two sorts. Then, PCI connectors 311, 312 and 313 are connected to the PCI bus 23 connected to the bridge 16, while PCI connectors 314, 315 and 316 are connected to the PCI bus 24 connected to the bridge 17.

FIG. 2 shows the situation in which a PCI expansion card 610 of LONG CARD is plugged into the PCI expansion board slot 316. Incidentally, in FIG. 2, there is shown only the space in the chassis in which the system board 71 is mounted. When the PCI expansion board 610 is mounted on the system board 71, the height (clearance) L3 from the board surface of the system board 71 to the base of the PCI expansion board 610 is about 15 mm. The length L1 in the X direction of the PCI expansion card 610 of LONG CARD is about 314 mm which is longer than the size Lx in the X direction of the system board 71. For this reason, any of the components which has the height equal to or higher than the clearance L3 can not be disposed in the region on the system board 71 which is located below the PCI expansion card 610 of LONG CARD. If the component height of the processor including the heat sink is L2, then L2 becomes larger than the clearance L3. Therefore, none of the processors can be disposed in the region which is located below the PCI expansion board. In the present embodiment, in order that the PCI expansion boards of LONG CARD may be able to be plugged into the six PCI connectors 311 to 316, respectively, the individual components are disposed as follows. First of all, the processors 11 and 13 are disposed on the upper region of the system board 71 with the directions thereof made to match each other in such a way that the processors 11 to 13 are parallel with one side of the system board 71 in the X direction. By disposing the individual processors in such a way, the length of the transmission line distributed between the processors 11 and 12 can also be made shortest. The PCI connectors 311 to 316 are disposed, on the lower region of the region in which the processors 11 to 13 are disposed, in such a way that when the PCI expansion boards are plugged into the PCI connectors 311 to 316, respectively, the board surfaces thereof are parallel with the line of the arrangement of the processors 11 to 13. The memory controller 15, and the bridges 16 and 17 are disposed in the region which is located below the region in which the processors are disposed and is adjacent to the region in which the PCI connectors 311 to 316 are disposed. In particular, the bridge 16 is disposed by the side of the PCI connectors 311 to 313, while the bridge 17 is disposed by the side of the PCI connectors 314 to 316. By disposing both of the bridges 16 and 17 in such positions, the line length of the PCI buses 23 and 24 can be made as short as possible. As a result, the propagation delay time of the signals on the PCI buses 23 and 24 becomes small, and hence the margin to the timing requirements can be sufficiently ensured. In addition, since the area which both of the PCI buses 23 and 24 occupy on the system board 71 can be reduced, a larger number of components can be disposed without interfering with each of the PCI buses 23 and 24. Incidentally, if the PCI connectors 311 to 316, and the bridges 16 and 17 are disposed so as to fulfill the positional relation as described above, when the PCI expansion cards of LONG CARD are plugged into the associated PCI connectors, both of the bridges 16 and 17 are located below the PCI expansion cards. But, since the amount of calorification of the bridges 16 and 17 is relatively small, in general, there is no need of mounting therefor the heat sink. Therefore, these components can be disposed in the region, which is located below the PCI expansion cards, without any problem.

A memory board connector 321 is disposed in the position between the region in which the processors 11 to 13 are disposed and the region in which the PCI expansion board cards 311 to 316 are disposed so as to be parallel with the PCI connectors 311 to 316. The maximum memory capacity of the PC server is in general equal to or larger than 128 MB. Therefore, in the case where as the memory module 621, the 16 MB memory module is used which is currently the mainstream in the 72 pins-single inline memory module (SIMM) as the standardized component, it is necessary to be able to mount the eight or more sheets of memory modules. For example, in order to mount the eight sheets of memory modules, the large mounting area of about 70 mm×120 mm is required. For this reason, if the memory module is intended to be disposed on the system board 71, it becomes difficult to accommodate the necessary number of components within the area of the board of Full-AT size. Then, in the present embodiment, the memory module 621 is mounted on the memory board 620 and the memory board 620 having the memory module mounted thereon is plugged into the memory board connector 321.

The processor bus 21 is routed in such a way that termination circuits 91, the processor 11, the processor 12, the bridge 16, the bridge 17, the memory controller 15, the processor 13 and termination circuits 92 are connected thereto one by one in this order so that the length of the stub is within the range of 5 to 8 mm. In other words, after the processor bus 21 has connected both of the processors 11 and 12 thereto, the processor bus 21 is routed in such a way that the direction thereof is changed at the section between the processors 12 and 13 in the Y direction of the system board 71. Then, after the processor bus 21 has connected both of the bridges 16 and 17 from the processor 12, the processor bus is folded back to reach both of the processor 13 and the termination circuits 92 through the memory controller 15. By routing the processor bus in such a way, the substantial branch of the processor bus is removed and the distortion of the signal on the processor bus due to the signal reflections by the stub is reduced. In the newest processors in which the data bus width is 64 bits, the number of signal lines is near 150, and many packages thereof are 50 mm×50 mm or more in size. In addition, in the memory controller and the bridge LSI as well, if the size of the chip and the wiring region are taken into consideration, then the length of the transmission line distributed between the chips becomes equal to or longer than about 30 to 50 mm. For this reason, assuming that in FIG. 1, both of the memory controller 15 and the bridges 16 and 17 are disposed between the processors 12 and 13 so that all of the elements are disposed on the straight line, the processor 13 must be separated from the processor 12 by at least 120 mm or more. Therefore, if the size of the processor is taken into consideration, then it becomes difficult to accommodate those elements on the board of Full-AT size which is employed in the present embodiment. However, if the processors 11 to 13, the memory controller 15, and the bridges 16 and 17 are disposed in the manner as described above, and also the processor bus 21 is bent into a protuberance shape at the section between the processors 12 and 13, then the distance in the X direction which the processor bus occupies on the system board is reduced by about 70 to 100 mm. Therefore, those elements can be sufficiently mounted on the board of Full-AT size. In this connection, considering the mounting region in terms of the area, then it is possible to remove the board area of Ly×100 mm or so.

In the front face of the chassis 500, there is installed a fan 51 for blowing air into the chassis 500 in order to cool collectively the processors 11, 12 and 13 which are disposed on the system board 71 in one line. The flow of air which is blown through the fan 51 is indicated by an arrow 58 in FIG. 2. Air which has been taken in through the fan 51 passes through a heat sink 113 disposed on the upper portion of the processor 13, a heat sink 112 disposed on the upper portion of the processor 12, and a heat sink 111 disposed on the upper portion of the processor 111 to be exhausted to the outside of the chassis through a draft hole 501 which is provided in the rear face of the chassis. In order to prevent the fins of the heat sinks 111 to 113 mounted on the respective processors from generating the turbulent flow of air, the positions of the adjacent heat sinks are adjusted so that the fins of the individual heat sinks are disposed in parellel with the flow of air thus blown. The draft hole 501 has also the function of exhausting air in the chassis, which is heated by the memory controller 15, the bridges 16 and 17, the PCI expansion card and the like, to the outside.

Next, another embodiment according to the present invention will hereinbelow be described.

Figure 3:
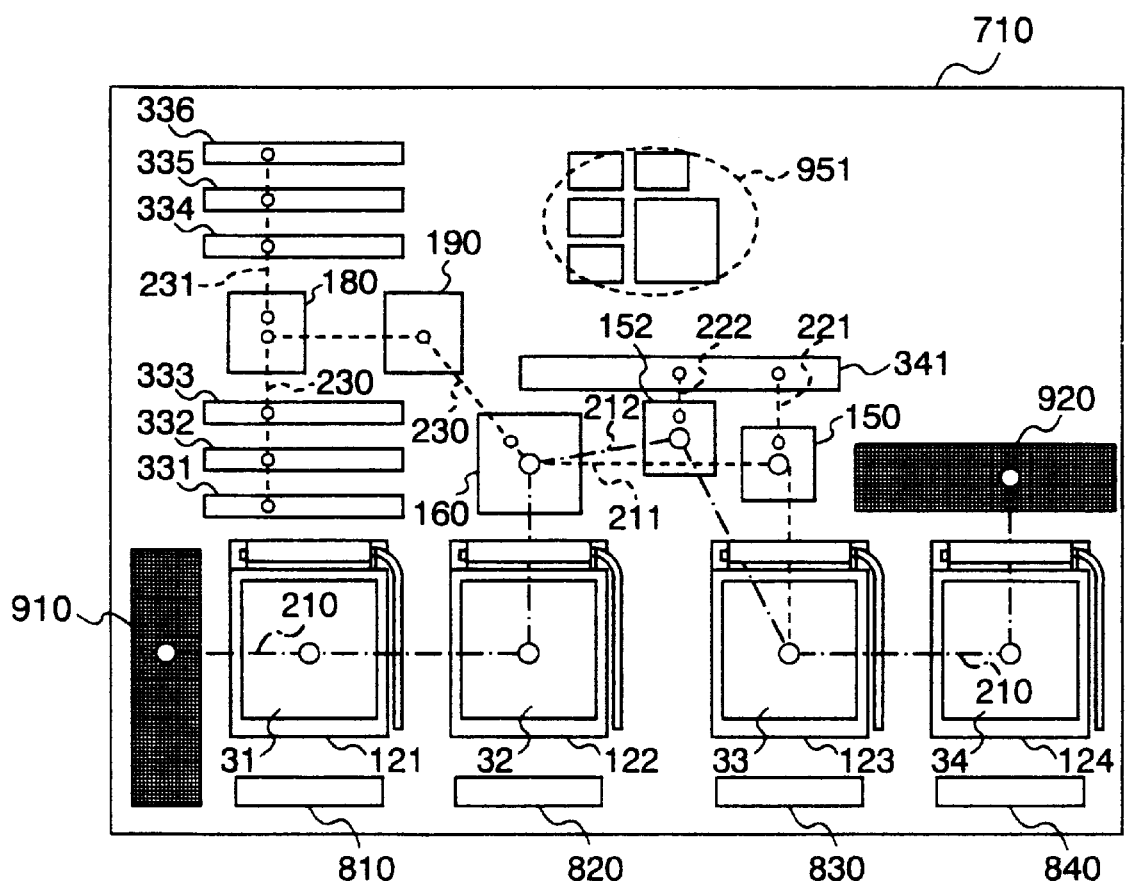
FIG. 3 is a plan view showing layout of components useful in explaining a system board of a PC server system according to a second embodiment of the present invention.
Figure 4:
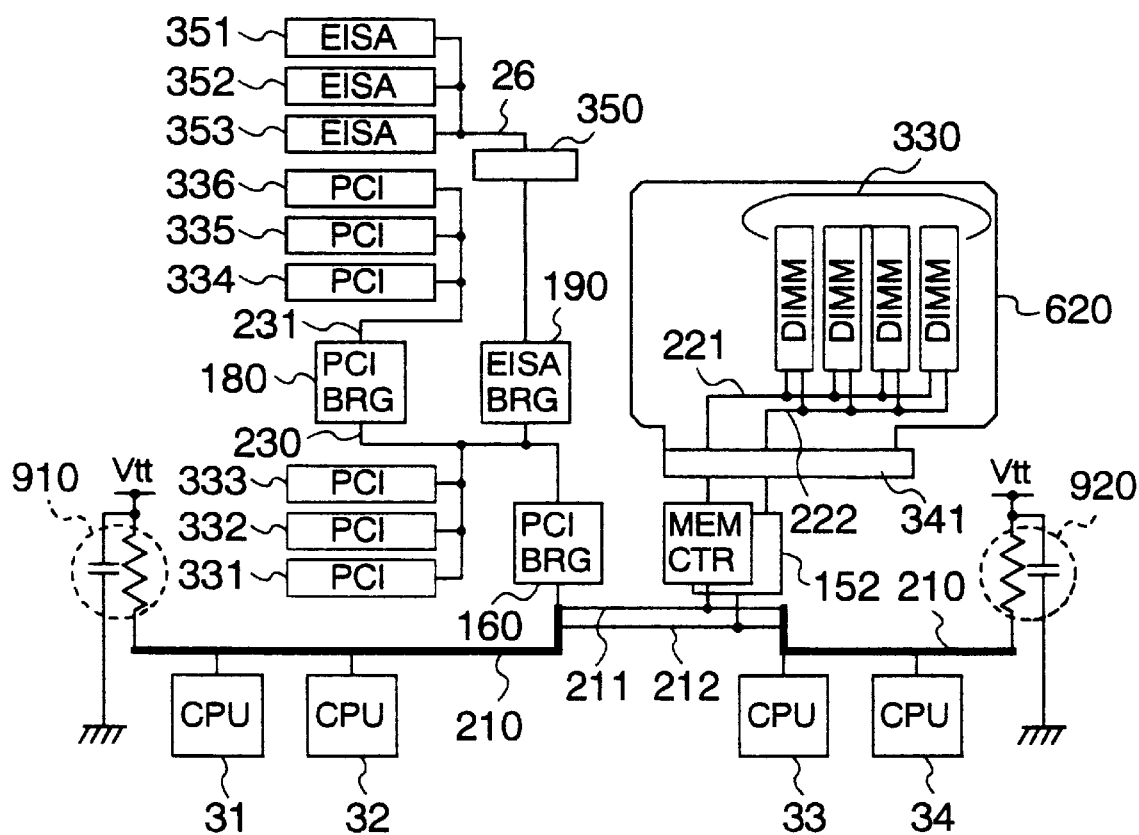
FIG. 4 is a block diagram showing a configuration of a PC server of the second embodiment.

FIG. 3 is a component layout diagram useful in explaining the component arrangement on a system board of a PC server and the wiring order of the buses thereof in a second embodiment according to the present invention, and FIG. 4 is a block diagram showing a configuration of the PC server of the present embodiment. In the present embodiment, four processors 31, 32, 33 and 34 are mounted on a system board 710 at most in accordance with the system construction. Each of the processors is detachably inserted into a Low Insertion Force Socket (LIF Socket) which is provided on the system board. Some processors which in order to realize the high integration of the chip and to reduce the power consumption during the operation thereof, do not employ the 5 V signal voltage which is conventionally the standard, but are operated with the lower voltage such as the 3,3 V or 2.9 V are also on the market. In the present embodiment, in order to be able to cope with such processors, connectors into which the DC—DC converters each for supplying therefrom the power source to the processors are respectively plugged are provided adjacent to the respective LIF sockets. For example, the DC—DC converter which is plugged into a connector 810 for a DC—DC converter generates, on the basis of the voltage of 5 V supplied from the outside to the system board 710, the operating voltage which is required for the processor 11 inserted into an LIF socket 121. Likewise, DC—DC converters which are respectively plugged into connectors 820, 830 and 840 for a DC—DC converter supply the power sources to the processors which are inserted into LIF sockets 122, 123 and 124, respectively. In this connection, the voltages which are supplied to the processors may be different for the processors.

The layout of the component arrangement on the system board 710 will hereinbelow be described concretely. Incidentally, hereinbelow, for the sake of convenience, it is assumed that when referring to top and down, and right and left with respect to the position on the system board 710, top and down, and right and left in FIG. 3 is referred.

In the present embodiment, the LIF sockets 121, 122, 123 and 124 are disposed along the lower side edge (in the figure, a portion corresponding to one side of a figure representing the board will be referred to as "an edge" in the present specification, when applicable) of the system board 710 and in parallel with that edge. The directions of the LIF sockets are adjusted in such a way that the directions of the processors inserted thereinto are made match one another. In the present embodiment, as the LIF sockets, there are employed ones each of which is about 60 mm×60 mm in size. In addition, the space between the LIF sockets 121 and 122 and the space between the LIF sockets 123 and 124 are set to about 20 mm, and the space between the LIF sockets 122 and 123 is set to about 35 mm. The space of about 30 mm is defined between each of the LIF sockets and the lower side edge of the system board 710, and the connectors 810, 820, 830 and 840 for a DC—DC converter are disposed in that region.

In the region which is located in the upper side of the LIF socket 121 on the system board 710, PCI connectors 331, 332, 333, 334, 335 and 336 are disposed in the order of increasing distance with respect to the LIF socket 121. The long sides of the PCI connectors are made parallel with the lower side edge of the system board 710 so that the PCI expansion cards plugged thereinto do not come in contact with any of the heat sinks mounted on the processors. In the present embodiment, the space between the LIF socket 121 and the PCI connector 311 is about 20 mm. The PCI connectors 311 to 316 are divided into two sets, i.e., a set of PCI connectors 311 to 313 and a set of PCI connectors 314 to 316 for the arrangement there of. A space is defined between the PCI connectors 313 and 314, and in this region, there are disposed a PCI—PCI bridge 180 for connecting a PCI bus 230 to a secondary PCI bus 231 and a PCI—EISA bridge 190 for executing the protocol conversion between the PCI bus and the EISA bus. In this connection, by the EISA bus is meant the name of the local bus which is being standardized by BCPR Services, Inc. The details thereof are, for example, described in an article of "EISA System Architecture" by HINDSHARE PRESS Corporation.

In the region which is located on the upper side, on the system board 710, of the LIF socket 122 and which is adjacent to the region in which the PCI connectors 311 to 313 are disposed, a PCI bridge 160 is disposed. In the present embodiment, the space between the PCI bridge 160 and the LIF socket 122 is about 20 mm, and the space between the PCI bridge 160 and the set of PCI connectors 311 to 313 is about 40 mm.

In the region which is located just on the right side of the PCI bridge 160 and on the upper side of the LIF socket 123, memory controllers are disposed. In the present embodiment, as the memory controllers, two LSIS, i.e., memory controllers 151 and 152 are employed. The memory controller 151 is disposed in the region on the system board 710 which is located on the upper side of the LIF socket 123 with the space of about 10 mm left from the LIF socket 123. In addition, the space between the PCI bridge 160 and the memory controller 151 is set to the range of about 40 to 50 mm so that the memory controller 152 can be disposed in the region between the PCI bridge 160 and the memory controller 151. A memory board connector 341 is disposed in the upper side, on the system board 710, of the region in which both of the memory controllers 151 and 152 are disposed in such a way that the long side of the memory board connector 341 is parallel with the lower side edge of the system board 710. In addition, as will be described later, the lengthwise position, on the system board, of the memory board connector 341 is adjusted in such a way that the memory board plugged thereinto does not come in contact with any of the PCI connectors which are respectively plugged into the PCI connectors 333 and 334. In the present embodiment, the lengthwise position of the memory board connector 341 is 190 to 220 mm away from the lower side edge of the system board 710. The memory controller 152 is disposed as close to the memory board connector 34 as possible.

The space between the LIF socket 121 on the most left-hand side and left side edge of the system board 710 is defined so as to be about 50 mm. In the region defined between the LIF socket 121 on the most left-hand side and the left side edge of the system board 710, a termination circuit 90 for terminating one end of the processor bus 210 is disposed. A termination circuit 920 for terminating the other end of the processor bus 210 is disposed in the region on the upper side of the LIF socket 124. Each of the termination circuits 910 and 920 includes a termination register for matching the effective impedance of the processor bus, a decoupling capacitor for suppressing the fluctuation of the termination voltage, and a termination voltage generating circuit. The parasitic inductance is present in the capacitor and also the frequency band in which the capacitor is operated in the form of the capacitive inductance is varied due to the construction materials and the capacity. Therefore, as the decoupling capacitor, there is employed the combination of the high frequency multilayer ceramic capacitor, the tantalum capacitor and the electrolytic capacitor. If the surface mounting components are used as these capacitors and also the component size is taken into consideration so that the height of those components are set to a value equal to or smaller than 15 mm so as for these components not to come into contact with any of the PCI bus expansion cards, then these components can be disposed in the region which will be located below the PCI expansion cards when plugging the PCI expansion cards into the respective PCI connectors.

The components which have been disposed as described above are connected by processor buses 210, 211 and 212, or memory buses 221 and 222. While each of these buses is indicated by one broken line in FIG. 3, in actual, each of them is formed by a plurality of wirings which are distributed substantially along these lines.

The processor bus 210 is the terminated bus, and in the present embodiment, the signal line of the inner layer in which the line impedance has the values in the range of 50 to 60Ω is used as the processor bus 210. The processor bus 210 connects the termination circuit 910, the LIF sockets 121 and 122, the PCI bridge 160, the memory controllers 151 and 152, the LIF sockets 123 and 124, and the termination circuit 920 in turn in such a way that the length of the stub becomes within 5 to 8 mm. More specifically, the processor bus 210 is routed in the transverse direction from the termination resistor 910 to connect the LIF sockets 121 and 122 in this order. Thereafter, the processor bus 210 is changed upwardly with the routing direction thereof to be connected to the PCI bridge 160. Out of the processor buses, the processor bus 211 including a part of the data lines and the control lines is routed to the LIF socket 123 through from the PCI bridge 160 to the memory controller 151. In addition, the processor bus 212 including a part of the address lines and the control lines is routed to the LIF socket 123 through from the PCI bridge 160 to the memory controller 152. After having been connected to the LIF socket 123, the processor bus 210 is routed so as to connect the LIF socket 124 and the termination resistor 920. As described above, the processor bus 210 is a terminated bus, and normally, the signal line in which the line impedance has the values in the range of 50 to 60Ω is used as the processor bus 210.

The processor bus 210 (including the processor buses 211 and 212) is the synchronous bus through which the processors 31 to 34, the memory controllers 151 and 152, and the PCI bridge 160 transmit/receive the data synchronously with the clock signal. In order that the data signal may operate at a certain operating frequency fc, it is required that the electrical signal, on the processor bus, which has been outputted from the transmission point, is propagated through the bus line within one cycle Tc (=1/fc) of the bus clock signal to reach the reception point to fulfill the set up and hold time necessary to the element which receives the electrical signal. The description will hereinbelow be given with respect to the limits in the wiring length of the processor bus which become the factors of limiting the layout of the elements on the processor buses. In this connection, in the case where the memory controllers 151 and 152, and the PCI bridge 160 are not particularly distinguished, these elements will hereinbelow be referred to as the interface LSIs, when applicable. In addition, the various kinds of values which are employed in the description are defined as follows, and when indicating the maximum value or the minimum value of the values, the suffix "_max" or "_min" are added to the following values.

L b1 . . . the length of the transmission line distributed between the LIF sockets 121 and 122;

L b2 . . . the length of the transmission line distributed between the LIF socket 122 and the PCI BRIDGE 160;

L b31 . . . the length of the transmission line distributed between the PCI bridge 160 and the memory controller 151;

L b32 . . . the length of the transmission line distributed between the PCI bridge 160 and the memory controller 152;

L b41 . . . the length of the transmission line distributed between the memory controller 151 and the LIF socket 123;

L b42 . . . the length of the transmission line distributed between the memory controller 151 and the LIF socket 123;

L b5 . . . the length of the transmission line distributed between the LIF sockets 123 and 124;

t sq . . . the total of the clock skew and the jitter;

t o1 . . . the time period elasped till the processor sends the data synchronously with the clock signal and the level of the signal on the output pin is changed;

t su1 . . . the set up time required when the processor fetches in the waveform of the signal on the processor bus;

t h1 . . . the hold time required when the processor fetches in the waveform of the signal on the processor bus;

t o2 . . . the time period elasped till the interface LSI sends the data synchronously with the clock signal and the level of the signal on the output pin is changed;

t su2 . . . the set up time required when the interface LSI fetches in the waveform of the signal on the processor bus;

t h2 . . . the hold time required when the interface LSI fetches in the waveform of the signal on the process bus;

vp . . . the speed at which the signal is propagated through the processor buses.

First of all, the description will hereinbelow be given with respect to the maximum line length of the processor buses through which the processors are connected to one another by taking as an example the operation based on which the processor 34 receives the data which has been transferred from the processor 31. FIG. 5 is a timing diagram showing the timing in the dats transmission between the processors 31 and 34. In the figure, CLK1 represents the timing of the clock signal (at the clock input pin of the processor 31) which is supplied to the processor 31, and CLK4 represents the timing of the clock signal which is supplied to the processor 34. In addition, the second waveform from the top shows the timing of the data which is outputted from the processor 31 onto the processor bus 210, and the lowest waveform shows the timing of the data which is outputted from the processor bus 210 to the processor 34. Each of the processors carries out the input/output of the data synchronously with the rise (the timing at which the clock signal is changed from "L" level to "H" level) of the clock signal supplied thereto. The processor 31 starts to output the data synchronously with the rise (at a time point 411) of CLK1. The signal level of the data at the data output pin is decided, due to the circuit delay in the inside of the processor 31, at a time point 412 elapsed from the time point 411 by to1_max at maximum. The data (the electrical signal which has been outputted as the data onto the processor bus 210) which has been outputted from the processor 31 matches the effective impedance at the termination circuits 91 and 92. In addition, this data is propagated through the processor bus 210 at the propagation speed vp and reaches the data input pin of the processor 34 after a time period has elapsed from the time point 412 by t_pd1 (at a time point 413). The propagation delay t_pd1 of the data ranging from at a time point when the output data from the processor 31 has been decided up to a time point when the input data to the processor 34 is decided can be expressed on the basis of the following expression.

$$t\_pd1 = (L\ b1 + L\ b2 + L\ b3 + L\ b4 + L\ b5)/vp \qquad (1)$$

The processor 34 fetches in the data on the processor bus 210 synchronously with the rise (at a time point 414) of CLK4. In order that the processor 14 may fetch in the data, it is required that the signal level is decided before the time point 414 by t su1_min. For this reason, in order that the data may be transmitted/received within the clock cycle Tc, the propagation delay t pd1 must fulfill the following relation.

$$t\ pd1 \leq Tc - (t\ o1\_max + t\ su1\_min + t\ sq) \qquad (2)$$

Therefore, the maximum line length L pp_max of the signal line through which the processors 11 and 14 are connected can be expressed on the basis of the following expression.

$$L\ pp\_max = (Tc - t\ o1\_max - t\ su1\_min - t\ sq) \times vp \qquad (3)$$

While the description has been given with respect to the data signal on the processor bus 210, with respect to the address signal as well, likewise, the maximum line length of the signal line needs to be made within Lpp__max. If the line length of the processor bus distributed between the processors 31 and 34 fulfills the above-mentioned condition, with respect to the combination of the processors other than the processors 31 and 34, the line length of the processor bus routed between the associated processors is shorter than that of the processor bus routed between the processors 31 and 34, and hence the discussion thereof does not need to be carried out here.

On the other hand, with respect to the line length of the processor bus routed between the processors and the interface LSI, the consideration is given with the case where the processor is disposed on the output side sorted out from the case where the interface LSI is disposed on the output side. In the case where the processor is disposed on the output side, if the maximum line length of the processor bus routed between the processor and the interface LSI is assumed to be L ip1__max, similarly to the length of the line routed between the processors, it is expressed as follows.

$$L\ ip1\_max = (Tc - t\ o1\_max - t\ su2\_min - t\ sq) \times vp \qquad (4)$$

In addition, the maximum line length in the case where the interface LSI is disposed on the output side is similarly expressed as follows.

$$L\ ip2\_max = (Tc - t\ o2\_max - t\ su1\_min - t\ sq) \times vp \qquad (5)$$

From the two expressions, the maximum value L ip__max of the line length which the processor bus routed between the processor and the interface LSI should fulfill is obtained on the basis of the following expression.

$$L\ ip\_max = Min(L\ ip1\_max,\ L\ ip2\_max) \qquad (6)$$

where Min(A, B) represents the function in which the smaller value of A and B is taken.

In addition, each of the maximum length L bm__max of the buses routed between the memory controller 151 and the PCI bridge 161, and between the memory controller 152 and the PCI bridge 160 can be similarly expressed on the basis of the following expression.

$$L\ bm\_max = (Tc - t\ o2\_max - t\ su2\_min - t\ sq) \times vp \qquad (7)$$

The conditions of the maximum length of the transmission line distributed between the associated elements which are obtained on the basis of the expressions as shown above are obtained in the form of a table shown in FIG. 6. In the table of FIG. 6, each blank space exhibits that the length of the transmission line distributed between the associated elements is shorter than that of any of other combinations, and hence the condition of the maximum line length may not be specially considered. If the wiring length of the processor bus routed between the associated elements fulfills all of the conditions shown in FIG. 6, then the processor bus of interest can be operated at the frequency fc.

Now, if it is assumed that the operating frequency of the processor bus is 66.6 . . . Mhz (Tc=15 nsec), the propagation speed vp of the signal on the processor bus is 110 mm/nsec, and the maximum value of the clock skew t sq is 0.9 nsec, and also as the processor, one is employed in which t su1__min=3 nsec and t o1__max=4 nsec, the relation of L pp__max=781 mm is obtained. In the present embodiment, the interface LSI is disposed in the vicinity of the center of the processor bus. Then, as for the distribution of the line length, the line length of the processor bus which is routed from the processor 32 to the processor 33, i.e., L b2+L b31+L b41 or L b2+L b32+L b42 is set so as to be about ⅓ of the line length L pp of the processor bus which is routed from the processor 31 to the processor 34. Then, the line length L ip between the interface LSI and the processor becomes about ⅔ of L pp. Therefore, if the line length between the processors 31 and 34 is set to 781 mm as the maximum allowable value, then L ip becomes about 520 mm. Then, the discussion is given with respect to the interface LSI timing characteristics t su2__min, t o2__max in which L ip=520 mm fulfills L ip1__max, L ip2-max. First of all, if based on expression (4) with respect to L ip__max as has already been described, then t su2__min can be expressed as follows.

$$t\ su2\_min = Tc - t\ o1\_max + t\ sq - L\ ip1\_max/vp \qquad (8)$$

Next, in the input buffer of the general synchronous circuit, the ratio of the set up time to the time till the data output is in the range of about 1:1 to 1:3. Then, on the assumption that the relation of t su2=¾×t o2 is established, t su2__min is obtained from expression (5) with respect to L ip2__max as follows.

$$t\ su2\_min = 3 \cdot t\ o2\_max/4 = 3(Tc - t\ su1\_min + t\ sq - L\ ip2\_max/vp)/4 = 4.8\ nsec \qquad (9)$$

Therefore, the required t su2__min of the interface LSI becomes 4.8 nsec which is obtained from the expression of L ip2__max which is severe in conditions. In addition, t os2__max is obtained as 6.3 nsec. As described above, according to the present embodiment, the characteristics required for the interface LSI become looser than those of any of the processors. As a result, as for the interface LSI, it is possible to employ the low speed one which is lower in manufacturing cost than any of the processors.

Next, the description will hereinbelow be given with respect to the minimum length of the transmission line distributed between the elements with reference to FIG. 7. FIG. 7 shows, as one example useful in explaining the minimum length of the transmission line between the processors, there is shown the operating timing when the processor 32 receives the data signal 218 which has been transmitted from the processor 31. In the figure, CLK1 represents a clock signal which is inputted to the processor 31 and CLK2 represents a waveform of a clock signal which is inputted to the processor 32. The processor 31 starts to output data 291 synchronously with the rise (at a time point 421) of CLK1. The level of the data signal at the output pin is decided at a time point 422. The data 291 is propagated through the processor bus at the propagation speed vp, and reaches the input terminal of the processor 32 at a time point 423. The processor 32 fetches in the data 291 on the processor bus synchronously with the rise (at a time point 424) of CLK2. Likewise, the data 292 which is outputted by the processor 31 synchronously with the next rise (at a time point 431) of CLK1 is decided at a time point 432. The time difference between the time point 431 and the time point 432 is t o1__min at the lowest. Then, the data 292 reaches the input terminal of the processor 32 at a time point 433. In this connection, in order that the processor 32 may fetch in the data 291, the signal level needs to be decided on and after a time point after the time point 424 by t h1__min. For this reason, in order that the processor 32 may transmit/receive the data 291 within the clock cycle Tc, the propagation time t pdl needs to fulfill the following relation.

$$t\ pd1 \geq (t\ h1\_min - t\ o1\_min + t\ sq) \qquad (10)$$

From the above, the minimum line length L pp__min of the processor bus routed between the processors 31 and 32 can be expressed by the following expression.

$$L\ pp\_min = (t\ h1\_min - t\ o1\_min + t\ sq) \times vp \quad (11)$$

On the other hand, the shortest line length which the processor bus should fulfill between the processor and the interface LSI in the case where the processor is located on the output side is different from that in the case where the interface LSI is located on the output side. The minimum line length L ip1_min which should be fulfilled in the case where the processor is located on the output side, and the minimum line length L ip2_min which should be fulfilled in the case where the interface LSI is located on the output side can be, similarly to the case of the minimum line length of the processor bus between the processors, obtained as follows, respectively.

$$L\ ip1\_min = (t\ h2\_min - t\ o1\_min + t\ sq) \times vp \quad (12)$$

$$L\ ip2\_min = (t\ h1\_min - t\ o2\_min + t\ sq) \times vp \quad (13)$$

Therefore, the minimum line length which the processor bus should fulfill actually is as follows.

$$L\ ip\_min = Max(L\ ip1\_min, L\ ip2\_min) \quad (14)$$

where Max(A, B) represents the function in which the larger value of A and B is taken.

In addition, the minimum line length L bm_min of the buses routed between the memory controller 151 and the PCI bridge 160, and between the memory controller 152 and the PCI bridge 160 can be expressed on the basis of the following expression.

$$L\ bm\_min = (t\ h2\_min - t\ o2\_min + t\ sq) \times vp \quad (15)$$

The conditions of the minimum length of the transmission line distributed between the associated elements which are obtained on the basis of the expressions as shown above are obtained in the form of a table shown in FIG. 8. In the table shown in FIG. 8, each blank space exhibits that the conditions of the minimum line length of the transmission line between the associated elements may not be considered. Normally, such minimum line length becomes a value equal to or smaller than about 80 mm.

A large number of recent processors have the data bus width of 64 bits or more, and the number of pins thereof including the ground and the power source exceeds 200. The wiring density between the LIF sockets has been increased along therewith, and hence three to four signal layers are used. For this reason, it is difficult to distribute such a signal line as to run through the LIF sockets. In addition, the provision of such wiring sometimes becomes the primary factor due to which the space between the LIF sockets must be increased, and hence it is not preferable in effective utilization of the board surface. In the present embodiment, since the LIF sockets are disposed in the vicinity of the edge of the system board, and the DC—DC converter has only to be disposed on the board edge side of the LIF sockets, the wiring running through the LIF sockets can be practically removed. For this reason, after the length of the processor bus routed between the LIF sockets has been made equal to or larger than the minimum line length L pp_min, the space between the LIF sockets can be reduced as much as possible and the increase in the area required to dispose the LIF sockets on the system board can be suppressed.

To the PCI bus 230, there are connected the PCI bus connectors 331 to 333, the PCI bridge 160, the PCI—PCI bridge 180, and the PCI—EISA bridge 190. In addition, to the secondary PCI bus 231, there are connected the PCI—PCI bridge 180 and the PCI connectors 334 to 336. In the present embodiment, the PCI bridge 160 is disposed in the region which is located just on the right-hand side of the PCI connectors 331 to 333 connected to the PCI bus 230 and which is located below the PCI expansion cards plugged thereinto. In addition, both of the PCI—PCI bridge 180 and the PCI—EISA bridge 190 are disposed in the region defined between the PCI bridges 333 and 334. As a result, the routing length of the PCI bus 230 and the secondary PCI bus 231 can be reduced as much as possible so that the margin in the timing design on the PCI bus can be increased. In addition, the increase in the board area required to route the PCI buses can be suppressed and also a larger number of components can be disposed without interfering any of the PCI buses.

FIG. 9 is an enlarged view of the vicinity of the memory board connector 341 on the system board 710. As has already been described with reference to FIG. 3, for the processor buses 211 and 212 to which the memory controllers 151 and 152 are respectively connected, there is utilized the wiring area of the inner layer. Then, in the present embodiment, the signal lines (the memory buses 221 and 222) through which the memory controllers 151 and 152 are connected to the memory board connector 341 are distributed by utilizing mainly the top, bottom layer. In order to reduce the fluctuation of the voltage supplied to the memory board, capacitors 97 of the surface mounting type are disposed around the memory board connector 341. In order that the line length of the memory buses 221 and 222 may be reduced as much as possible without reducing the wiring density thereof, the decoupling capacitors 97 are mainly mounted on the system board across the memory board connector 341 from the memory controllers 151 and 152. The pads for soldering are disposed on the board surface to which the decoupling capacitors 97 are mounted, and vias for connecting therethrough the capacitors 97 to the power source layer and the grounding layer are provided in the inner layer of the system board.

Figure 10:
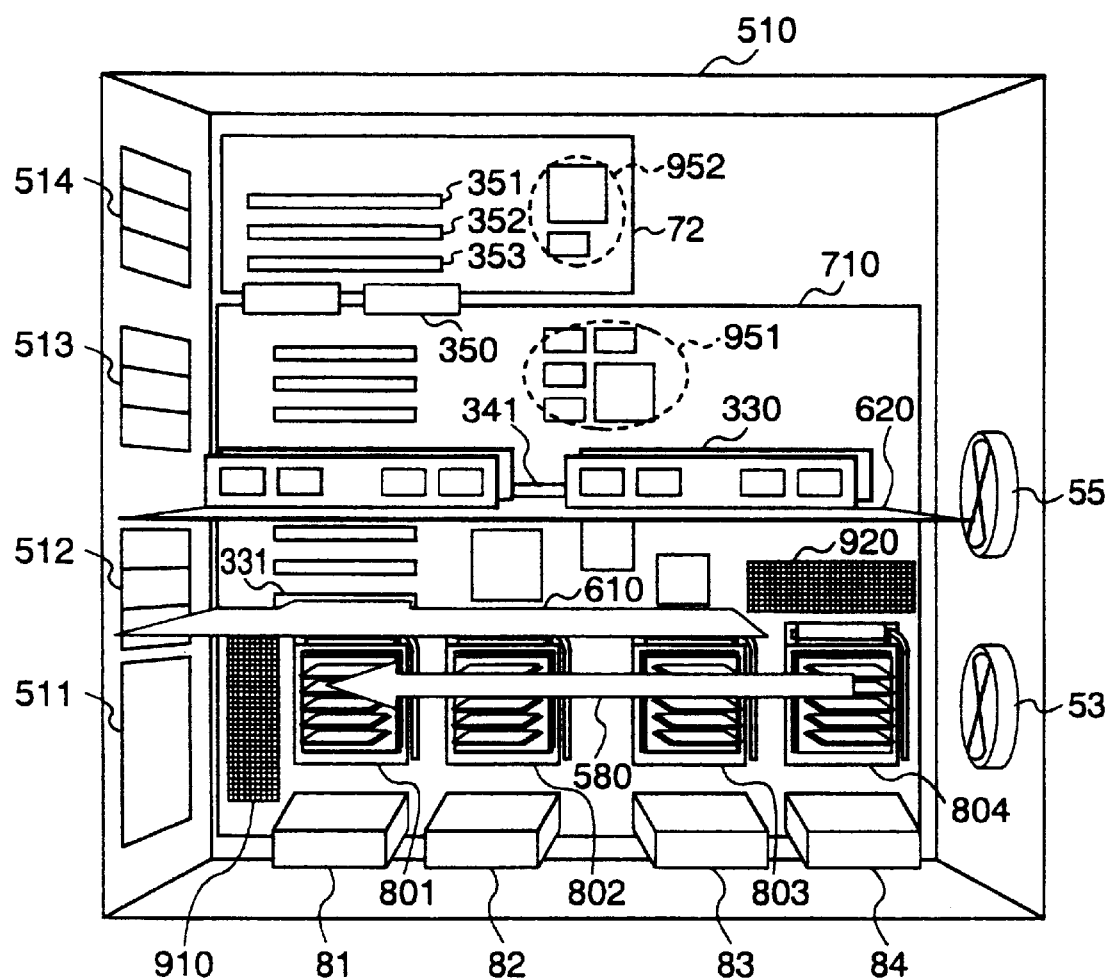
FIG. 10 is a plan view useful in explaining the spatial interference between the components in a chassis of the PC server system in the second embodiment of the present invention.

FIG. 10 is a top plan view showing the state in which the system board 710 shown in FIG. 3 is mounted in the chassis. Now, the description will hereinbelow be given with respect to the spatial interference between the components in the present embodiment with reference to FIG. 10.

To the system board 710 which is mounted in the chassis 510, there are connected the memory board 620, the PCI expansion card 610 of LONG CARD, and the EISA—I/O board 720. In this connection, the EISA—I/O board 720 is connected to the system board 710 through the connectors 350. On a region 952 located on the EISA—I/O board 720, there are disposed the logical circuits such as the buffers on the EISA bus. The EISA—I/O board 720 is connected to the system board 710 through the connector 341. In the figure, reference numerals 801, 802, 803 and 804 designate heat sinks which are mounted to the processors 31, 32, 33 and 34, respectively. Reference numerals 351, 352 and 353 designate EISA connectors. In the chassis 510, there are installed fans 53 and 55 for cooling the processors, the PCI expansion cards 610, and the memory board 620, respectively. Reference numerals 512 and 513 designate chassis I/O apertures which are provided in the chassis 510 in order to mount thereto the PCI bus expansion card, and reference numeral 514 designates an aperture which is provided in the chassis 510 in order to mount thereto the EISA bus expansion card.

Figure 11:
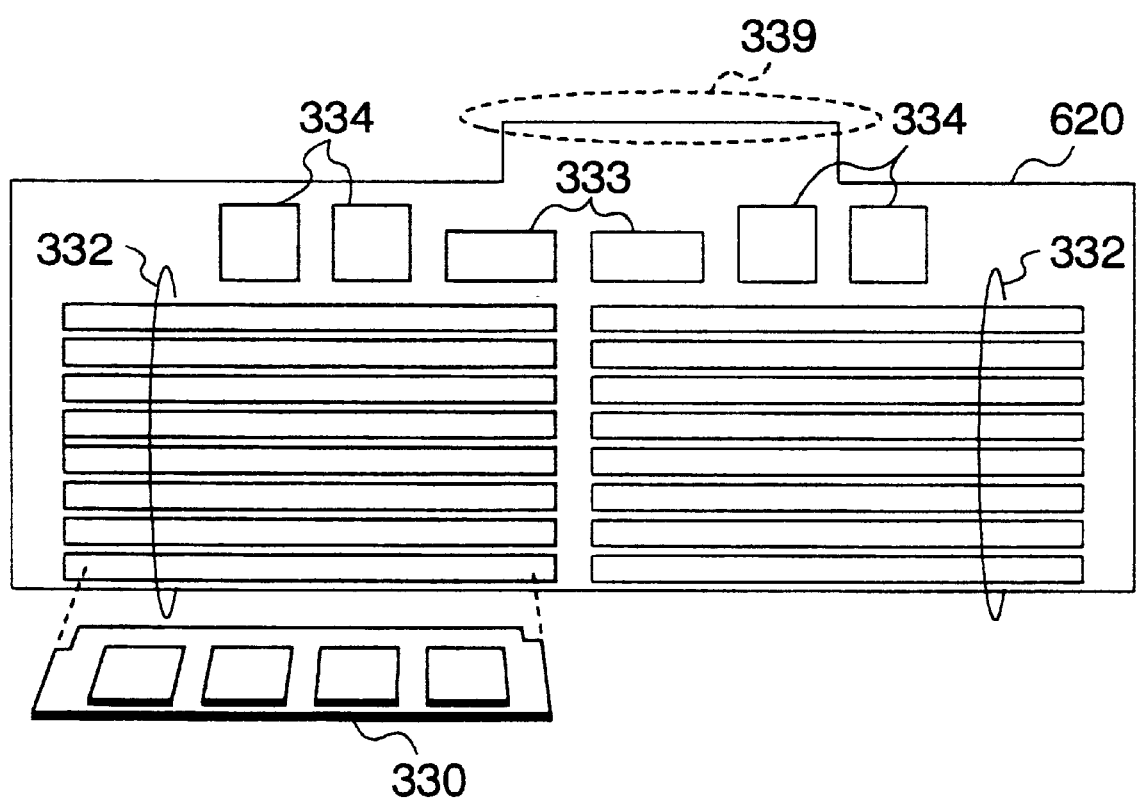
FIG. 11 is a plan view showing the memory board of the PC server.

In the memory board 620, in the case where the memory modules of 32 MB are employed, as shown in FIG. 11, sixteen sheets of memory modules 330 can be plugged into slots 332, respectively, so that the main storage capacity of 512 MB can be obtained. On the memory board 620, in addition thereto, there are mounted address buffers 333, multiplexers 334 each for converting the data line of the memory bus into the signal which fits into the construction of the memory module, and the like. Reference numeral 339 designates a connector portion which is to be inserted into a memory board connector 341.

Figure 12:
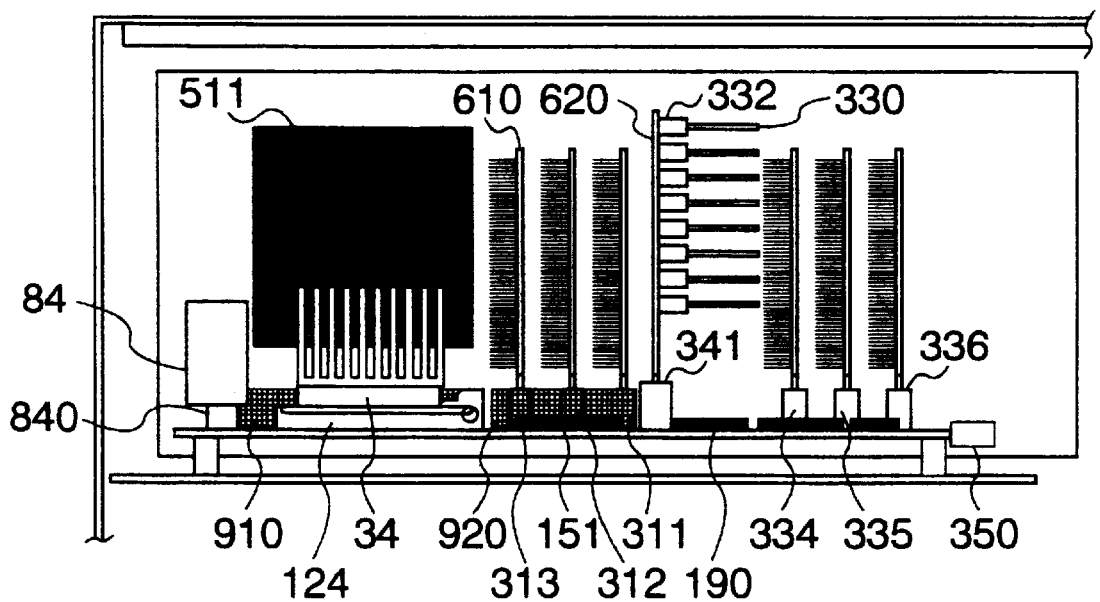
FIG. 12 is a side elevational view useful in explaining the spatial interference between the components in the component layout shown in FIG. 10.

FIG. 12 is a side elevational view useful in explaining the spatial interface between the components. In the space which is located below the PCI expansion cards 311 to 313, there are disposed the interface LSIs such as the bridge 160 as the LSI of the flat package type, and the termination circuit 920. These components are lower in component height than the clearance which is located below the PCI expansion cards and hence do not come in contact with any of the PCI expansion cards at all. In addition, in the space which is defined below the PCI expansion cards which are plugged into the PCI connectors 314 to 316, a region 951 can be provided in which the general wiring is carried out by employing the TTL—IC and the LSI each having the low component height such as the combination logic. As for the circuits and the like which can be disposed in the region 951, there are given the power source control circuit, the interruption control circuit, the diagnosis circuit and the like for example.

In order that any of the memory modules 330 mounted on the memory board 620 may not come in contact with the PCI expansion cards plugged into the PCI connectors 316, the space of 45 mm or more which is obtained by adding the height of about 30 mm of the memory module 330 to the thickness of about 15 mm of the PCI expansion card is defined between the memory board 620 and the connector 316.

Since each of the DC—DC converters has the power transistors, the electrolytic capacitors and the transformer mounted thereon, the component shape thereof is relatively large. Therefore, in the DC—DC converters each having such a shape as to be mounted longitudinally as shown in FIGS. 10 and 12, in general, the component height thereof is equal to or higher than 30 mm. In addition, the calorification of several watts is normally generated due to the loss of the voltage conversion. For this reason, if the DC—DC converters 81 to 84 are disposed in the center of the system board, then the DC—DC converters 81 to 84 will prevent air in the chassis which is heated up by the PCI expansion cards and the like from flowing towards a draft hole 501. In addition, if these DC—DC converters are disposed in the region between the processors and the bridge LSI 16, then the processor bus must be routed so as to make a detour to avoid each of the through holes for mounting therethrough the DC—DC converters, and as a result, the wiring density will be remarkably reduced. In the present embodiment, such a problem is avoided by disposing the DC—DC converters 81 to 84 in the vicinity of the board edge of the system board 710.

In addition, an arrow 580 shown in FIG. 10 indicates the flow of air which is blown into the chassis through the fan 53 installed in the chassis 510. In the present embodiment as well, since the processors are disposed on the system board in one line, it is possible to cool more efficiently the processors by the fan 53.

As described hereinabove, according to the present embodiment, it is possible to dispose effectively the components such as the processors, the interface LSIs, and the PCI connectors on the system board. As a result, it is possible to mount a plurality of high performance processors each having the relatively large outside dimension on one system board without increasing the size of the system board so much. In addition, it is possible to cool efficiently, collectively the processors each having a large amount of calorification by one fan. As a result, since the complicated chassis structure is made unnecessary and also the chassis size can also be decreased to some degree, it is possible to reduce the manufacturing cost.

In addition, the line length of the PCI bus and the memory bus can be shortened, and hence the electrical distortion of the signals on the memory bus and the PCI bus can be suppressed all the more. In addition, since the propagation delay time of the signal can also be shortened, the margin to the timing requirements of the PCI bus can be increased, and even when plugging the various kinds of PCI expansion cards which are on the market from various companies, it becomes easy to operate the PCI bus at the maximum operating frequency of 33.3 . . . Mhz in the specification. As a result, since it is possible to avoid any of the troubles of the PC server system due to the electrical degradation of the PCI bus signal, it is possible to construct the reliable PC server system.

Further, for any of the processors, the propagation delay time of the electrical signal between the processor of interest and the memory controller, or the propagation delay time of the electrical signal between the processor of interest and the PCI bridge can be made shorter than the propagation delay time of the electrical signal between the processor of interest and the most remotely located processor. For this reason, in contrast to the processors which were manufactured by utilizing the newest semiconductor process, even the processors in which the gate delay time of the processor bus interface is relatively larger can be used as the peripheral LSIs such as the memory controller and the PCI bridge. As a result, the processors which were manufactured by utilizing the semiconductor process which is relatively low in manufacturing cost can be used as these peripheral LSIs.

Incidentally, while in the embodiments as described above, the processors are disposed in the vicinity of the edge of the system board in one line, it is also possible to dispose the processors at the center of the system board. In this case, the PCI connectors are disposed on the both sides of the line of the processors, and also the PCI bridges are disposed on the respective sides. In this connection, the PCI buses are routed from the respective PCI bridges so as not to run through the regions between the processors. For example, in the case where the four processors are disposed, the signal and the processor buses running through the processor arrangement portion are routed through the space between the second and third processors which are located at the center. In this case as well, the PCI bridges and the PCI connectors may be disposed close to each other.

INDUSTRIAL APPLICABILITY

As set forth hereinabove, according to a board layout method of the present invention, in an information processor in which a plurality of processor elements are capable of being mounted thereon, a plurality of processor elements to be mounted can be, while suppressing the increase in the board area, disposed on one system board without interfering with other components. In addition, a plurality of buses to be routed on a system board can be suitably routed thereon so as to fit the respective characteristics, and hence even in the high speed operation, the sufficient margin to the timing requirements can be ensured. As a result, the processors which were manufactured by utilizing the process which is relatively low in manufacturing cost can be used as the peripheral LSIs without reducing the reliability thereof. Accordingly, it is possible to provide a high performance and small information processor which is capable of being manufactured without increasing the manufacturing cost thereof.

What is claimed is:

1. A method of disposing components on a system board mounted on a chassis of an information processor, said system board having main components including a plurality of processor elements mounted thereon and connected together by a processor bus, said method comprising the following steps:

disposing said plurality of processor elements on said system board in one line that is in parallel with a first edge of said system board;

disposing expansion board slots and a memory board connector in a region on said system board opposite to the first edge such that long sides thereof are in parallel with the first edge, wherein said expansion board slots are each arranged to receive therein an expansion board on which an I/O interface is mounted, said I/O interfaces are connected by an I/O bus, and said memory board connector is arranged to be connected to a memory board on which a memory is mounted; and disposing a bridge LSI and memory controllers in regions which are located along the extension direction of the long sides of said expansion board slots and said memory board connector, wherein said bridge LSI executes protocol conversion between said processor bus and said I/O bus, said memory controllers control access to the memory on said memory board, and said regions are adjacent to both of the region in which said expansion board slots and said memory board connector are disposed and the region in which said plurality of processor elements are disposed.

2. A method of disposing components according to claim 1, wherein said bridge LSI is disposed so as to be in close proximity to the extension board slots connected thereto, and said memory controllers are disposed so as to be in close proximity to said memory board connector.

3. A method of disposing components according to claim 2, wherein at least said bridge LSI is disposed in the region which is located just under the expansion boards which are plugged into said expansion board slots.

4. A method of disposing components according to claim 1, wherein said processor bus connects said plurality of processor elements, said bridge LSI and said memory controllers in turn in such a way that a branch does not form, and also is routed in such a way that both of said bridge LSI and said memory controllers are located on said processor bus and in the middle of said plurality of processor elements.

5. An information processor in which a system board having main components including a plurality of processor elements mounted thereon is mounted in a chassis, said information processor comprising:

a plurality of processor elements which are disposed on said system board in one line in parallel with a first edge of said system board;

a plurality of expansion board slots which are disposed in a region, on said system board, opposite to the first edge when viewed from said processor elements on said system board, and which are arranged along the direction perpendicular to the first edge in such a way that the long sides thereof are parallel with the first edge;

a bridge LSI which is disposed in a region on said system board adjacent to both of the region in which said expansion board slots are disposed and the region in which said processor elements are disposed, and which serves to execute protocol conversion between processor buses for connecting therethrough said plurality of processor elements and an I/O bus for connecting therethrough said expansion board slots;

memory control elements which are disposed on said system board so as to be in close proximity to said bridge LSI;

a memory board connector which is disposed on said system board in such a way that it is in close proximity to said memory control elements and the long side thereof is parallel with the first edge;

wherein said processor buses are routed on said system board in order to connect said plurality of processor elements, said bridge LSI, and said memory controllers in turn in such a way that a branch does not form and both of said bridge LSI and said memory controllers are located in the middle of said plurality of processor elements;

wherein said I/O bus is routed on said system board in order to connect said plurality of expansion board slots and said bridge LSI; and memory buses which are routed on said system board in order to connect said memory control elements and said memory board connector.

6. An information processor according to claim 5, wherein at least a part of the region in which said bridge LSI is disposed is located below the expansion boards which are plugged into said plurality of expansion board slots.

7. An information processor according to claim 5, further comprising a cooling fan which is provided in a portion of said chassis corresponding in position to the extension of the line connecting said plurality of processors, and which serves to blow air from the outside into said chassis.

8. An information processor according to claim 5, further comprising termination circuits for matching the effective impedance of the processor bus at both ends thereof.

9. An information processor according to claim 8, wherein said I/O bus and said memory buses are unterminated buses.

10. An information processor according to claim 5, wherein the arrangement position of said memory board connector is adjusted in such a way that the memory board plugged thereinto does not come in contact with any of the extension boards which are plugged into said expansion board slots.

* * * * *